(12) United States Patent
Akutsu et al.

(10) Patent No.: US 9,862,525 B2
(45) Date of Patent: Jan. 9, 2018

(54) POURING FITTING HAVING EXCELLENT SLIPPING PROPERTY FOR FLUID SUBSTANCES

(71) Applicant: TOYO SEIKAN GROUP HOLDINGS, LTD., Tokyo (JP)

(72) Inventors: Yosuke Akutsu, Yokohama (JP); Shinya Iwamoto, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 143 days.

(21) Appl. No.: 14/762,887

(22) PCT Filed: Feb. 7, 2014

(86) PCT No.: PCT/JP2014/052880
§ 371 (c)(1),
(2) Date: Jul. 23, 2015

(87) PCT Pub. No.: WO2014/126010
PCT Pub. Date: Aug. 21, 2014

(65) Prior Publication Data
US 2015/0360820 A1   Dec. 17, 2015

(30) Foreign Application Priority Data
Feb. 14, 2013   (JP) ................................ 2013-026987

(51) Int. Cl.
*G11B 5/64*   (2006.01)
*B65D 25/42*   (2006.01)
(Continued)

(52) U.S. Cl.
CPC .............. *B65D 25/42* (2013.01); *B65D 1/02* (2013.01); *B65D 47/40* (2013.01); *B05D 5/00* (2013.01);
(Continued)

(58) Field of Classification Search
CPC .......... B65D 1/02; B65D 25/42; B65D 47/40; B65D 1/0207; B65D 1/08; B65D 25/40;
(Continued)

(56) References Cited

U.S. PATENT DOCUMENTS 3,782,601 A * 1/1974 Krawagna .............. B65D 33/24
222/107
5,509,585 A * 4/1996 Mock ..................... B65D 5/746
215/341

(Continued)

FOREIGN PATENT DOCUMENTS

JP   02-140249 A   5/1990
JP   11-278519 A   10/1999
(Continued)

OTHER PUBLICATIONS

Sushant Anand et al., "Enhanced Condensation on Lubricant-Impregnated Nanotextured Surfaces," ACS NANO, Oct. 2, 2012, pp. 10122-10129, vol. 6, No. 11.
(Continued)

*Primary Examiner* — Paul R Durand
*Assistant Examiner* — Andrew P Bainbridge
(74) *Attorney, Agent, or Firm* — Sughrue Mion, PLLC

(57) ABSTRACT

A pouring fitting having a flow passage for flowing fluid substance 100, wherein said flow passage is forming a liquid-permeable surface 110 in at least the tip portion thereof that serves as a pouring port. The pouring fitting has markedly improved slipping property and non-adhering property for liquid or paste-like fluid substances.

7 Claims, 6 Drawing Sheets

(51) Int. Cl.
*B65D 47/40* (2006.01)
*C09D 5/16* (2006.01)
*B05D 5/08* (2006.01)
*B05D 5/00* (2006.01)
*B65D 1/02* (2006.01)
*B65D 1/08* (2006.01)
*F28F 13/18* (2006.01)
*F16L 9/14* (2006.01)
*B65D 5/74* (2006.01)
*B65D 75/58* (2006.01)
*B65D 41/34* (2006.01)
*B65D 47/08* (2006.01)

(52) U.S. Cl.
CPC ............ *B05D 5/005* (2013.01); *B05D 5/08* (2013.01); *B65D 1/0207* (2013.01); *B65D 1/08* (2013.01); *B65D 5/746* (2013.01); *B65D 41/3428* (2013.01); *B65D 47/08* (2013.01); *B65D 75/5883* (2013.01); *C09D 5/1681* (2013.01); *C09D 5/1693* (2013.01); *F16L 9/14* (2013.01); *F28F 13/18* (2013.01); *G11B 5/64* (2013.01)

(58) Field of Classification Search
CPC ...... C09D 5/1681; C09D 5/1693; C09D 5/16; B05D 5/00; B05D 5/005; B05D 5/08; G11B 5/64; F28F 13/18; F16L 9/14
USPC .... 222/80–91, 105, 566, 108, 571; 524/546, 524/577; 220/717–718; 428/141, 167; 442/79, 97, 118
See application file for complete search history.

(56) References Cited

U.S. PATENT DOCUMENTS

| | | | | |
|---|---|---|---|---|
| 5,971,613 | A * | 10/1999 | Bell | .............. B29C 65/18 383/104 |
| 6,176,394 | B1 * | 1/2001 | Shimko | .............. B65D 33/2541 222/185.1 |
| 7,870,980 | B2 * | 1/2011 | Wilson | .............. B65D 47/0809 215/235 |
| 9,353,646 | B2 * | 5/2016 | Aizenberg | .............. A61L 15/24 |
| 2003/0096083 | A1 | 5/2003 | Morgan et al. | |
| 2007/0059490 | A1 * | 3/2007 | Kaneko | .............. G02B 1/105 428/141 |
| 2010/0092621 | A1 * | 4/2010 | Akutsu | .............. B32B 27/18 426/106 |
| 2011/0111173 | A1 * | 5/2011 | Ogawa | .............. C23C 24/08 428/141 |
| 2012/0118886 | A1 | 5/2012 | Sekiguchi et al. | |
| 2013/0034695 | A1 * | 2/2013 | Smith | .............. B08B 17/065 428/143 |
| 2014/0147627 | A1 * | 5/2014 | Aizenberg | .............. A61L 15/24 428/141 |
| 2014/0187666 | A1 | 7/2014 | Aizenberg et al. | |
| 2014/0290731 | A1 | 10/2014 | Aizenberg et al. | |
| 2014/0290732 | A1 | 10/2014 | Aizenberg et al. | |
| 2015/0017334 | A1 | 1/2015 | Sekiguchi et al. | |

FOREIGN PATENT DOCUMENTS

| | | |
|---|---|---|
| JP | 2007-284066 A | 11/2007 |
| JP | 2008-133009 A | 6/2008 |
| JP | 2008-222291 A | 9/2008 |
| JP | 2009-214914 A | 9/2009 |
| JP | 2010-254377 A | 11/2010 |
| WO | 2012/100099 A2 | 7/2012 |
| WO | 2014/010534 A1 | 1/2014 |

OTHER PUBLICATIONS

International Search Report of PCT/JP2014/052880 dated May 20, 2014.

* cited by examiner

POURING FITTING HAVING EXCELLENT SLIPPING PROPERTY FOR FLUID SUBSTANCES

CROSS REFERENCE TO RELATED APPLICATIONS

This is a National Stage of International Application No. PCT/JP2014/052880 filed Feb. 7, 2014, claiming priority based on Japanese Patent Application No. 2013-026987 filed Feb. 14, 2013, the contents of all of which are incorporated herein by reference in their entirety.

TECHNICAL FIELD

This invention relates to a pouring fitting having excellent slipping property for fluid substances.

BACKGROUND ART

Plastic materials have been widely used for a variety of applications since they can be easily formed in a variety of shapes and, specifically, have been widely used as containers since they are light in weight as compared to metals and glasses.

When the plastic containers are used for containing viscous fluid substances such as ketchup, mayonnaise, paste, shampoo and liquid detergent, it is desired that these contents can be quickly and thoroughly discharged without adhering or remaining in the container. For this purpose, therefore, study has been conducted extensively, and there have been proposed various kinds of containers having excellent slipping property for such contents.

A patent document 1, for instance, is proposing a bottle of a multilayer structure including an innermost layer of an olefin resin that has an MFR (melt flow rate) of not less than 10 g/10 min.

The innermost layer of this multilayered bottle has excellent wettability for the oily content. Therefore, if the bottle is inverted or tilted, the oily content such as mayonnaise or the like falls down spreading along the surface of the innermost layer and is thoroughly discharged without adhering or remaining on the inner wall surface (innermost layer surface) of the bottle.

Further, patent documents 2 and 3 are proposing bottles of a polyolefin resin having an innermost layer that is blended with a saturated or unsaturated aliphatic amide as a lubricating agent.

The above patent documents 1 to 3 are all for improving the slipping property of the plastic containers for the content relying on the chemical composition of the thermoplastic resin composition that is forming the inner surfaces of the containers, and are achieving improvement in the slipping property to some extent. Due to limitations on the kinds of the thermoplastic resins and the additives that are used, however, there is a limit in improving the slipping property, and striking improvements have not been achieved yet.

Under such circumstances, therefore, a study has been forwarded from a physical point of view in an attempt to improve the slipping property. For instance, a patent document 4 is proposing a container in which hydrophobic fine oxide particles having an average primary particle diameter of 3 to 100 nm are adhered on the inner surface thereof.

According to the art proposed by the patent document 4, fine ruggedness is formed on the surface with which the content comes in contact and water-repelling property (hydrophobic property) is expressed by the finely rugged surface. That is, in addition to attaining the hydrophobic property of the material that is forming rugged surface, there is formed a pneumatic layer in the gaps in the rugged surface, the pneumatic layer exhibiting higher water-repelling property than that of the material that is forming the container. As a result, the aqueous content adheres much less to the container.

Here, the slipping property for the fluid contents is required not only by the containers but also by the pouring fittings as represented by a spout fitted to, for example, a bag-like container or a cap equipped with a pouring cylinder that serves as a pouring portion for pouring out the content.

The arts proposed in the above-mentioned patent documents 1 to 4 are all concerned to the containers but are not adapted to the pouring fittings. Besides, a further improvement has been desired concerning the slipping property for viscous fluid substances.

The present applicant has previously proposed a packing container in which at least part of the surface, with which the content comes in contact, permits a liquid to permeate through, and the liquid different from the content is held in the liquid-permeable surface (Japanese Patent Application No. 2012-199236). This technology gives very excellent slipping property for the content but is applied to the containers only.

Concerning the pouring fitting, further, the present applicant has previously proposed a pouring member having a pouring port for discharging a viscous fluid, wherein a hydrophobic layer of hydrophobic inorganic fine particles is selectively formed on an upper end surface of the pouring member (PCT-JP2012/080236). This technology, however, is still pursuing further improved slipping property.

PRIOR ART DOCUMENTS

Patent Documents

Patent document 1: JP-A-2007-284066
Patent document 2: JP-A-2008-222291
Patent document 3: JP-A-2009-214914
Patent document 4: JP-A-2010-254377

OUTLINE OF THE INVENTION

Problems that the Invention is to Solve

It is, therefore, an object of the present invention to provide a pouring fitting having markedly improved slipping property and non-adhering property for fluid substances.

Another object of the present invention is to provide a pouring fitting having markedly improved slipping property and non-adhering property for fluid substances as a result of physically treating the surface thereof and holding a liquid in the surface.

Means for Solving the Problems

The present inventors have conducted experiments extensively about viscous fluid substances such as ketchup and the like. As a result, the inventors have discovered the fact that if a tip portion of a flow passage that serves as a pouring port of the fluid substance has a surface (liquid-permeable surface) that holds a liquid that has permeated therein, the liquid being different from the fluid substance flowing through the above tip portion and if the liquid-permeable surface holds the liquid different from the fluid substance and, specifically, holds a liquid immiscible with the fluid substance, then markedly improved slipping property and non-adhering property are exhibited for the fluid substance preventing the fluid substance from adhering on the portion that serves as the pouring port and, besides, enabling the liquid substance to be quickly discharged, and have thus completed the invention.

That is, according to the present invention, there is provided a pouring fitting having a flow passage for flowing fluid substance, wherein the flow passage is forming a liquid-permeable surface in at least the tip portion thereof that serves as a pouring port.

In the present invention, it is desired that:
(1) The liquid-permeable surface is holding a liquid different from the fluid substance;
(2) The covering ratio F with the liquid is not less than 0.26, the covering ratio F being represented by the following formula (1), $$F = (\cos \theta - \cos \theta_B)/(\cos \theta_A - \cos \theta_B) \quad (1)$$

wherein θ is a water contact angle on the liquid-permeable surface holding the liquid different from the fluid substance,
$\theta_A$ is a water contact angle on the liquid different from the fluid substance, and
$\theta_B$ is a water contact angle on a surface of the flow passage forming no liquid-permeable surface;
(3) The liquid is immiscible with the fluid substance; and
(4) The pouring fitting is formed of a plastic material.

Further, the pouring fitting of the present invention can assume the following embodiments:
(5) The pouring fitting is fitted onto a mouth portion of a container;
(6) The pouring fitting is a cap fitted onto a mouth portion of a container, said cap having a pouring cylinder that serves as the flow passage when the fluid substance contained in the container is poured out;
(7) The pouring fitting is a hinged cap fitted onto the mouth portion of a container;
(8) The pouring fitting is a spout fitted onto a bag-like container or a container made from a paper; and
(9) The pouring fitting is fitted to the mouth portion of the container which is a packing container that contains a viscous paste-like or slurry fluid substance having a viscosity at 25° C. of not less than 100 mPa·s.

In the invention, the liquid-permeable surface formed in the tip portion of the flow passage that serves as a pouring port, stands for a surface on where the liquid remains without falling down when the surface is dipped in the liquid and is taken out therefrom. Concretely, the liquid-permeable surface stands for a finely rugged surface in which the capillarity becomes dominant over the gravity.

Further, the fluid substance stands for a substance that easily changes its shape when a force is exerted thereon in its stationary state, and excludes gelatinous substances like yogurt, custard pudding and those that hold their shapes in their stationary state like butter and cheese.

In the present invention, the liquid-permeable surface holds the liquid different from the fluid substance that flows through this portion. This means that the liquid held in the liquid-permeable surface is immiscible with the fluid substance and is not removed therefrom by the fluid substance that flows through this portion. That is, if the liquid is miscible with the fluid substance, then the liquid held in the liquid-permeable surface mixes with the fluid substance, and is removed from the liquid-permeable surface. After all, the liquid can no longer be held therein.

Effects of the Invention

The pouring fitting used for discharging the fluid substance has a flow passage through which the fluid content flows. Here in the present invention, the flow passage is forming a liquid-permeable surface in at least the tip portion thereof that serves as a pouring port to hold therein a liquid (hereinafter often called lubricating liquid) that is different from the fluid substance.

Referring to the pouring fitting of the present invention shown in FIG. 1 that illustrates the principle of the invention, a liquid-permeable surface 110 is formed in at least the tip portion of the flow passage through which a fluid substance 100 flows, and has a finely rugged surface where the capillarity becomes dominant over the gravity. Here, the surface 110 holds a lubricating liquid 120 which is immiscible with the fluid substance 100 that is discharged flowing through the flow passage.

Therefore, the fluid substance 100 is discharged along the flow passage surface (liquid-permeable surface 110) while coming in contact with the lubricating liquid 120. Therefore, even the fluid substance 100 that happens to be a viscous fluid substance can be very quickly discharged by tilting or inverting the flow passage. Besides, the fluid substance 100 can be very effectively prevented from adhering or staying on the flow passage surface in addition to effectively preventing such inconvenience as creeping of the liquid.

For instance, the pouring fitting having the flow passage may be formed by using an olefin resin without, however, forming the liquid-permeable surface in the flow passage. In this case, however, even if the flow passage (pouring fitting) is tilted, the fluid substance (e.g., ketchup) remains adhered more than the case of the present invention as will be understood from the experimental results of Examples appearing later. Namely, in the present invention, the layer of liquid held in the liquid-permeable surface works as a lubricating layer providing a liquid-liquid interfacial contact and presumably contributes to improving non-adhering property to the fluid substance.

Further, if the flow passage has no surface that serves as the liquid-permeable surface 110 and if there is held no lubricating liquid, then as will be understood from the experimental results of Examples appearing later, the slipping property is not enough for the fluid substance and it is not possible to effectively prevent the fluid substance discharged through the flow passage from adhering or staying therein.

BRIEF DESCRIPTION OF THE DRAWINGS

FIG. 8A1 shows the angle θ of formula (1) which is a water contact angle on the liquid-permeable surface holding the liquid different from the fluid substance.

FIG. 8B1 shows the angle $\theta_A$ of formula (1) which is a water contact angle on the liquid different from the fluid substance.

FIG. 8C1 shows angle $\theta_B$ of formula (1) which is a water contact angle on the surface of the flow passage forming no liquid-permeable surface.

MODES FOR CARRYING OUT THE INVENTION

<Materials and Form of the Pouring Fitting>

The pouring fitting of the present invention has a flow passage through which the fluid substance is discharged. There is no limitation on the material or form of the pouring fitting so far as the above-mentioned liquid-permeable surface can be formed in the flow passage.

For instance, the pouring fitting may be formed by using a thermoplastic or thermosetting plastic material or may be formed by using a metal, a glass or various ceramics. Further, the pouring fitting may be a spout fitted onto a bag-like container or a paper container, may be a pouring cap fitted onto the mouth portion of a container such as bottle, may be a nozzle for ejecting the content by being attached to an aerosol can or to a lid of a bubbling container, or may, further, be pipes used for discharging fluid substances.

By taking formability and the like into consideration, however, it is, usually, desired that the pouring fitting is made from a thermoplastic or thermosetting plastic material and, specifically preferably, a thermoplastic material (e.g., a polyester as represented by polyethylene terephthalate or an olefin resin such as polyethylene or polypropylene) from such a standpoint that they can be shaped by various forming means such as extrusion forming, injection forming or the like method.

In principle, further, the pouring fitting of the invention may have a flow passage through which the fluid substance flows. From the standpoint of satisfying the requirement of improved slipping property, particularly, for viscous fluid substances and greatly enhancing the commercial value by preventing such inconvenience as creeping of liquid as a result of improved slipping property, however, it is desired that the pouring fitting of the invention assumes the form of being fitted to the container and is used for discharging the fluid content that is contained in the container.

Specifically, the pouring fitting is in a form which permits the fluid content to be discharged by its own weight when the container is tilted or inverted, or in a form which permits the fluid content contained in the container to be discharged when the container is squeezed. Namely, the pouring fitting is in the form of a spout fitted to the above-mentioned bag-like container or paper container, or is in the form of a pouring cap fitted to the mouth portion of the container such as bottle from the standpoint of utilizing the advantage of the present invention to a maximum degree.

FIGS. 1 to 6 show representative structures of the pouring fitting that is used being fitted to the above-mentioned containers.

Figure 2:
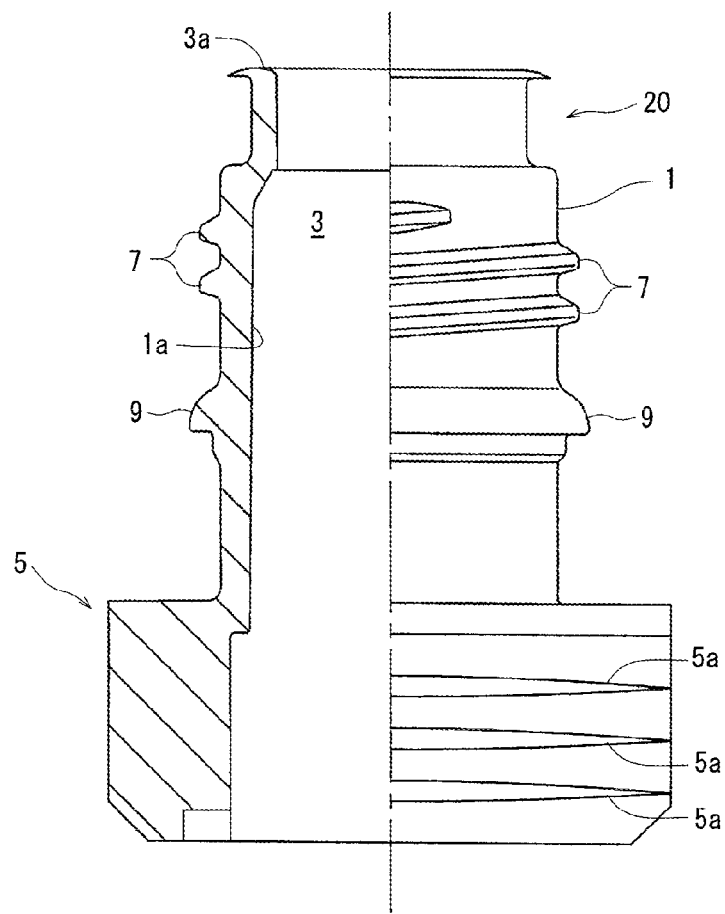
FIG. 2 is a side view showing half in cross section the structure of a spout which is an embodiment of a pouring fitting of the present invention.

FIG. 2 shows a spout fitted to the bag-like container. The spout (generally designated at 20) comprises a cylinder 1 with its interior being penetrated through and hollow. The cylinder 1 is forming a flow passage 3 along its inner surface 1a, and its upper end portion is forming a pouring port 3a through which the fluid substance will be discharged.

The cylinder 1 has, formed on the lower portion on the outer surface thereof, an extended portion 5 for melt-adhering a film that forms a bag-like container. The extended portion 5 has a plurality of ribs 5a (three ribs in FIG. 1) formed in parallel maintaining a distance in the up-and-down direction. The ribs 5a are protruding maintaining a small and equal height so as to be reliably melt-adhered to the bag-like container (film) upon the heat-sealing.

Figure 3:
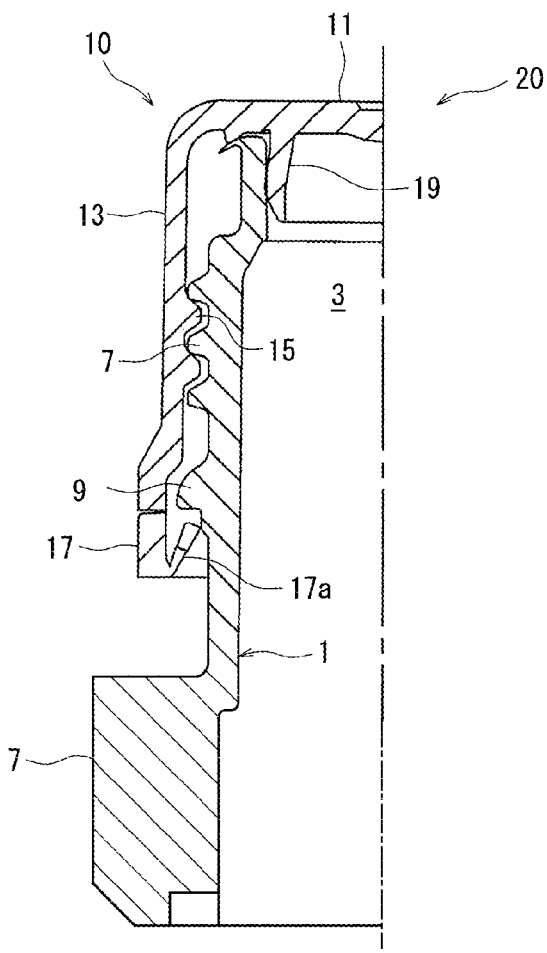
FIG. 3 is a view showing half in cross section the spout of FIG. 2 together with a lid body.

With reference also to FIG. 3, the cylinder 1 forms, on its upper portion on the outer surface thereof, a screw 7 for screw-fixing a lid body 10 that is mounted on the spout 20. A flange portion 9 is formed protruding outward on the lower side of the screw 7. The upper part of the screw 7 is formed in a small diameter so will not to hinder the lid body 10 that is screw-fitted thereto and to squeeze the width of the fluid substance that is poured out from the upper end.

That is, as shown in FIG. 3, the lid body 10 is fitted onto the spout 20 from the upper part of the cylinder 1 and is secured thereto by screw-fitting. The lid body 10 includes a top plate 11 and a skirt portion 13. The skirt portion 13 forms, on its inner surface, a screw 15 that comes in screw-engagement with the screw 7 formed on the outer surface of the cylinder 1, and forms at its lower end a tamper-evidencing band (TE band) that has been known per se. On the other hand, the inner surface of the top plate 11 is provided with a seal ring 19.

That is, in a state where the upper end of the cylinder 1 is closed by the screw-engagement of the screw 7 with the screw 15, the seal ring 19 is closely contacted to the inner surface 1a of the cylinder 1 whereby the flow passage is sealed, the fluid substance is prevented from leaking to the exterior, and foreign matter is prevented from infiltrating into the container.

In the state where the lid body 10 is mounted, further, the TE band 17 is positioned under the flange 9 on the outer surface of the cylinder 1. That is, the TE band is continuous to the lower end of the skirt portion 13 via a breakable bridging portion and is forming an upwardly facing protuberance 17a on the inner surface thereof. Therefore, if it is attempted to open the lid body 10 (break the screw-engagement) and to remove it off the cylinder 1, the skirt portion 13 rises but the TE band 17 is restricted from rising due to the engagement of the protuberance 17a with the flange 9. As a result, the lid body 10 is removed with the TE band 17 being cut off the skirt portion 13. The TE band 17 that is cut off makes a general consumer recognize the fact that the lid body 10 has been opened. This prevents unauthorized use such as tampering and, therefore, guarantees the quality of the content.

The bag-like container to which the spout 20 is fitted permits the fluid content to be discharged from the upper end portion of the cylinder 1 that serves as the pouring port. Here, it is also allowable to fit the pouring port to a tube or the like and discharge the fluid content through the tube. The bag-like container can be used not only as a beverage container filled with various beverages but also as a medical bag filled with various medicinal liquids or liquids for transfusion or a bag for intravenous dripping. If used for medical purposes, in particular, the bag-like container can be preferably used in the intubation nutrition method that feeds nutrition directly into the stomach or intestines by using a predetermined tube.

Figure 4:
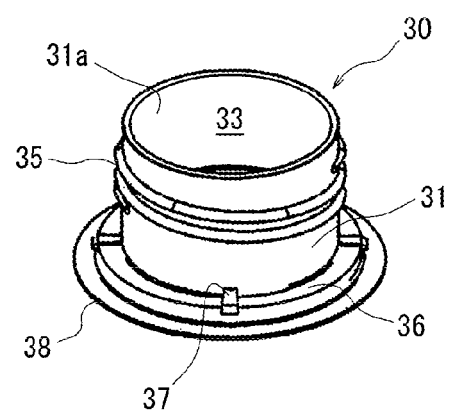
FIG. 4 is a sectional view showing the structure of a cap for a paper container which is an embodiment of the pouring fitting of the present invention.

FIG. 4 shows the structure of the spout for paper containers. The spout for paper containers generally designated at 30 is considerably simple in the structure which, however, is basically the same as that of the spout for bag-like containers described above.

The spout 30 has a cylinder 31 that forms the flow passage. Namely, the internal space of the cylinder 31 serves as a flow passage 33, i.e., the inner surface 31a of the cylinder 31 forms the flow passage 33. The upper end part of the cylinder 31 serves as the pouring port.

Figure 5:
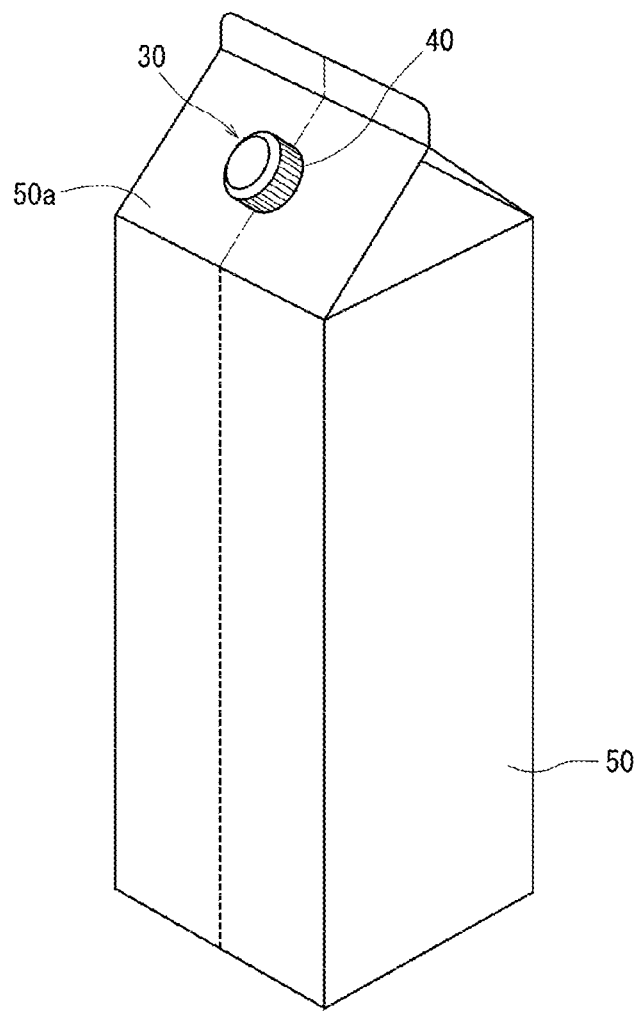
FIG. 5 is a view showing a state where the cap for paper container of FIG. 4 is fitted onto the paper container.

With reference also to FIG. 5, a screw 35 is formed on the outer surface of the cylinder 31 for fixing the lid body 40 by screw-engagement. Further, a thick washer 36 is formed at the lower end of the cylinder. 31, the washer 36 forming a plurality of pawls 37 maintaining a distance in the circumferential direction and, further, forming an annular flange 38 at the lower end thereof.

The spout 30 has the lid body 40 screw-fitted to the cylinder 31. In this state, the spout 30 has its lower portion inserted in the mouth portion of a paper sheet that is forming a paper container as shown in FIG. 5. In a state where the pawls 37 are false-fitted to the paper sheet, the paper sheet is fixed by heat-sealing to the upper surface of the annular flange 38. Thus, as shown in FIG. 5, the spout 30 is fixed to the upper tilted portion 50a of the paper container 50.

The paper container has a light shielding property to a large extent and is used for containing, specifically, those contents that are subject to be deteriorated by light.

Figure 6:
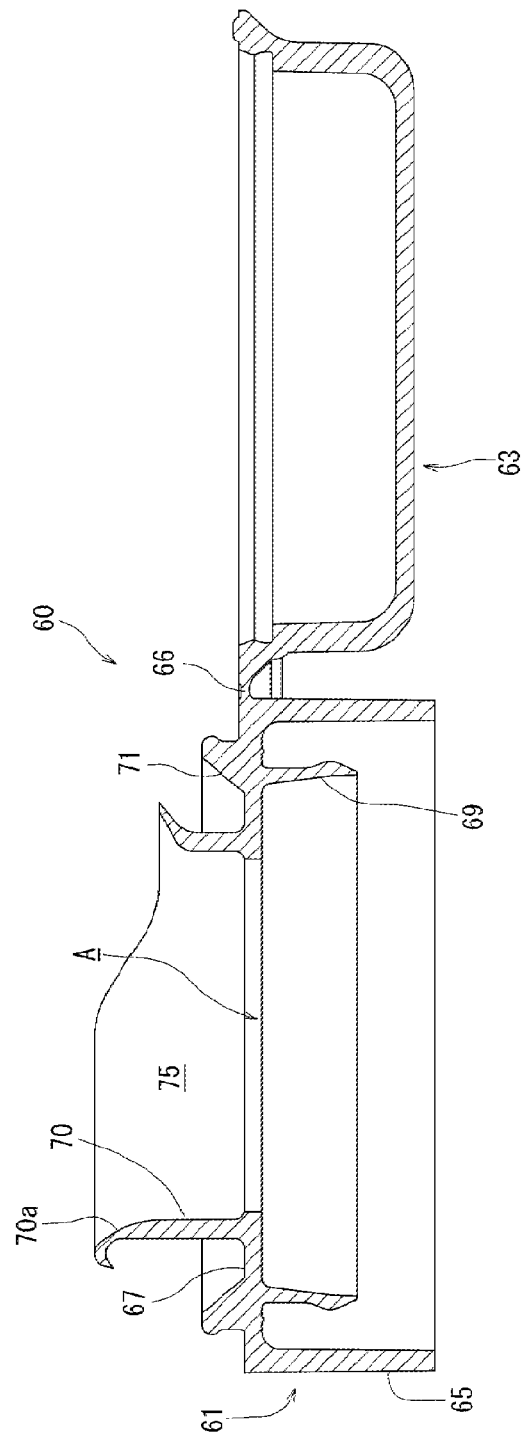
FIG. 6 is a sectional view showing the structure of a pouring cap which is an embodiment of the pouring fitting of the present invention.

FIG. 6 shows the structure of a pouring cap fitted onto the mouth portion of a container such as bottle or the like.

In FIG. 6, the cap (generally designated at 60) comprises roughly a cap body 61 and an upper lid 63.

The cap body 61 includes a cylindrical side wall 65 and a top wall 67 having an opening A in the central portion thereof.

The upper lid 63 is coupled by hinge to a hinge band 66 at an upper end portion of the cylindrical side wall 65.

An inner ring 69 is provided on the lower surface of the top wall 67 of the cap body 61, the inner ring 69 extending downward maintaining a small gap relative to the cylindrical side wall 65. That is, the mouth portion of the container such as bottle is fitted into space between the cylindrical side wall 65 and the inner ring 69 so as to be fixed thereto.

On, the other hand, a pouring cylinder 70 is provided on the outer surface of the top wall 67 so as to surround the opening A. Further, a short engaging protuberance 71 is formed on the outer side of the pouring cylinder 70.

That is, when the upper lid 63 is turned and closed with the hinge band 66 as a fulcrum, the circumferential edge portion of the upper lid 63 comes into engagement with the engaging protuberance 71; i.e., the upper lid 63 is firmly fixed in its closed state.

Further, as will be understood from FIG. 6, the pouring cylinder 70 is short on the side of the upper lid 63. This is such that the upper lid 63 can be turned and closed without being hindered by the pouring cylinder 70.

Further, though not shown in FIG. 6, a seal ring is, usually, formed on the inner surface of the upper lid 63 so that when the upper lid 63 is closed, the seal ring comes into close contact with the inner surface of the pouring cylinder 70 to maintain sealing capability.

In the pouring cap 60 of the above-mentioned structure, a flow passage 75 is formed by the inner surface 70a of the pouring cylinder 70 (and by the inner surface of the cylindrical side wall 65), and the fluid substance (content) contained in the container such as bottle is discharged flowing through the flow passage 75.

Therefore, in this embodiment as will be understood from FIG. 6, the pouring port is formed by a tall portion of the upper end of the pouring cylinder 70 on the side opposite to the upper lid 63. On the side of the upper lid 63, the content is not discharged since it is hindered by the upper lid 63.

In the diagramed embodiment, the upper lid 63 is coupled by hinge. It is, however, also allowable to detachably attach the upper lid 63 by screw-engagement. In this case, a screw for screw-engagement is formed on the outer surface instead of forming the engaging protuberance 71. Further, at the time of discharging the content through the flow passage 75 formed by the pouring cylinder 70, the upper lid 63 has now removed. Therefore, the pouring cylinder 70 does not have to be partly shortened, and the whole circumference of the upper end of the pouring cylinder 70 serves as the pouring port.

In the pouring fittings of various kinds of structures shown in FIGS. 2 to 6, the flow passages are drawn in a state where the contents are being discharged. In their state of not being used, however, it is a widely accepted practice to have the flow passage closed by a shut-off wall that has a score for tearing off the flow passage and attach a pull ring to the shut-off wall. In the pouring cap of FIG. 6, for example, the lower end of the pouring cylinder 70 is closed by the shut-off wall. A general consumer who purchased the container provided with the above pouring fitting would try to take out the content by, first, removing the shut-off wall by pulling the pull-ring letting the flow passage to be in its open state.

The above-mentioned pouring fittings shown in FIGS. 2 to 6 inclusive of their lid bodies are formed by the injection forming or the compression forming by using thermoplastic materials, specifically, various olefin resins such as low-, intermediate- or high-density polyethylene, linear low-density polyethylene, isotactic polypropylene, syndiotactic polypropylene, poly 1-butene, poly 4-methyl-1-pentene, or random or block copolymers of α-olefins like ethylene, propylene, 1-butene or 4-methyl-1-pentene; polyester resins such as polyethylene terephthalate and, preferably, various polyethylenes or polypropylenes, or polyethylene terephthalate.

<Liquid-Permeable Surface and its Forming>

In the pouring fitting of any form of the present invention, the liquid-permeable surface is formed in a portion that becomes at least the pouring port on the surface forming the flow passage as described above.

Figure 1:
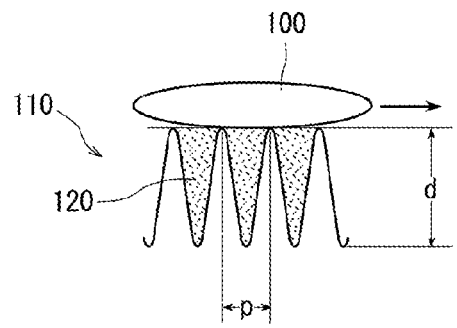
FIG. 1 is a view illustrating the principle of the present invention.
Figure 7:
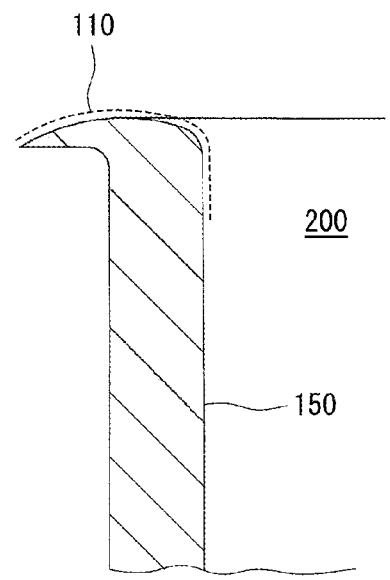
FIG. 7 is a view showing, on an enlarged scale, a tip portion of the flow passage which is a major portion of the pouring fitting of the present invention.
Figure 8A:
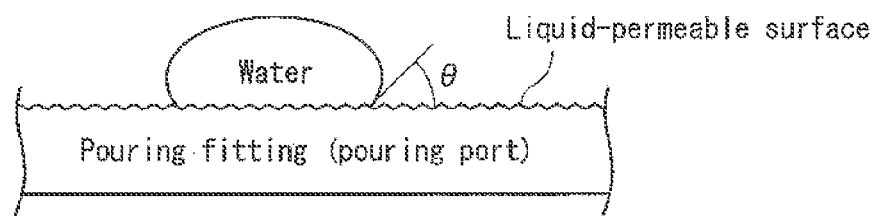
Figure 8B:
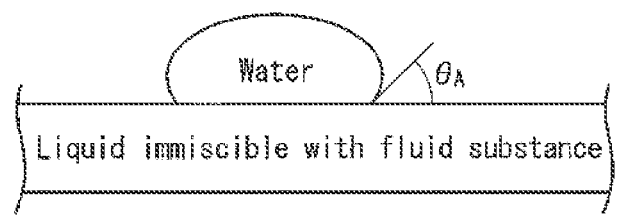
Figure 8C:
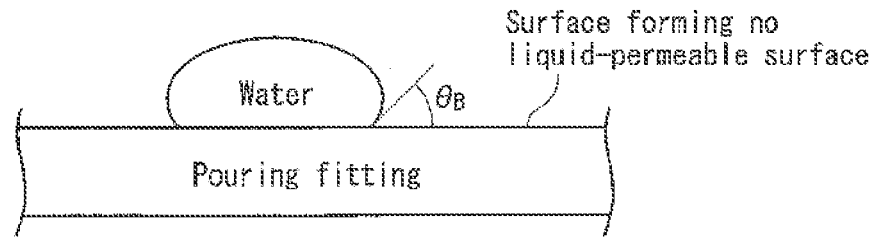

As shown in FIG. 7, the liquid-permeable surface is formed in at least the inner surface portion at the upper end of the cylinder that has the inner surface forming the flow passage. Or concretely, the liquid-permeable surface 110 shown in FIG. 1 is formed in at least the inner surface portion at the upper end of, for example, the cylinder 1 of the spout 20 of FIG. 2, the cylinder 35 of the spout 30 of FIG. 4, or the pouring cylinder 70 of the pouring cap 60 of FIG. 6.

In FIG. 7, a dotted line represents the liquid-permeable surface 110, a reference numeral 200 represents the flow passage, and 150 represents the cylinder (or the pouring cylinder) having the inner surface that forms the flow passage 200.

In the example of FIG. 7, the liquid-permeable surface 110 is selectively formed on the inner surface at the upper end of the cylinder 150 (at the upper end of the flow passage 200 serving as the pouring port). It is, however, allowable to form the liquid-permeable surface 110 on the whole inner surface of the cylinder 150 inclusive of the above-mentioned portion, as a matter of course. Or the liquid-permeable surface 110 may be extending up to the outer surface side of the cylinder 150.

In FIG. 7, further, the upper end of the cylinder 150 has a shape protruding outward. However, the upper end does not necessarily have to be of the protruded shape, and the cylinder 150 can be formed in the shape of simply a straight drum. For example, if the fluid content is to be drunk directly from the cylinder 150, then it does not have to be of the outwardly protruding shape. The same also holds if the cylinder 150 is to be fitted into a tube or the like.

As described already, the liquid-permeable surface 110 is a finely rugged surface where the capillarity becomes dominant over the gravity, and holds a liquid (hereinafter often called lubricating liquid) immiscible with the fluid substance that is the content (fluid content) without permitting it to be removed by being mixed with the fluid content.

Namely, the liquid permeates into the surface under a condition where the contact angle θ is smaller than 90 degrees. However, the liquid that has permeated cannot be held in the surface unless the capillarity is dominant. This is because the liquid is removed due to the gravity.

The range in which the capillarity is dominant is called capillary length ($\tau^{-1}$) and is represented by the following formula, $$\tau^{-1}=(\gamma a/\rho g)^{1/2}$$

wherein γ a is an interfacial tension between the liquid and the gas (air),

ρ is a density of the liquid, and g is a gravitational acceleration.

That is, the capillarity becomes dominant (height of the liquid droplet increases) in a range from a line of contact on where the liquid droplet, gas and solid (inner surface of the cylinder) are in contact simultaneously to a capillary length ($\tau^{-1}$). As will be understood from the above formula, the capillary length remains constant depending on the liquid irrespective of the material forming the inner surface of the container and, in the case of, for example, water, is about 2.7 mm.

Referring, therefore, to FIG. 1 described earlier, to form the liquid-permeable surface, the inner diameter of the dents represented by L may be set to be not larger than the capillary length ($\tau^{-1}$). The capillary length differs depending on the kind of the liquid (lubricating liquid) but lies in a range in excess of 1 mm for many kinds of liquids. Therefore, the dents having the inner diameter of not larger than 1 mm may be distributed over a predetermined portion on the inner surface of the cylinder 150 shown in FIG. 7. In this case, the depth d and pitch p of the dents and the density of the dents (number of the dents per a unit area) may be so set that the amount of the lubricating liquid that is held lies in a range that will be described later and that the cylinder 150 does not lose its strength or the like properties.

The above-mentioned liquid-permeable surface (fine dents) 100 is formed by a suitable means depending on the material and form of the pouring fitting.

As means for forming the above-mentioned fine dents, there have been known mechanical means such as metal mold, roll transfer, embossing work or spraying; optical means such as photolithography or etching using a laser beam; application or dipping by applying or mixing (in-massing) fine particles (fine metal oxide particles or fine polymer particles) or by adding them to a solution, or application or dipping by applying or mixing (in-massing) crystalline additives or adding them into a solution; lamination of the porous sheet (e.g., nonwoven fabric); or forming fine structures by utilizing the crystallization of resins. Dents may be formed in the liquid-permeable surface by selecting a suitable means out of the above means depending on the material and form of the container.

If the liquid-permeable surface is to be made of a metal, for example, dents are formed in a predetermined potion of a metal plate of before being formed into a cylinder relying on mechanical means such as roll transfer or embossing work, followed by punching and squeeze-ironing. Thereafter, the metal plate is formed into a predetermined shape.

If the liquid-permeable surface is to be made of a glass, a glass material of before being formed into a cylinder is in-massed with a powder of a high-melting metal oxide, or the molten crystalline additives are directly applied onto the cylinder that has been formed, or the crystalline additives are dispersed in a solvent which is then sprayed onto the cylinder or in which the cylinder is dipped to form dents therein.

If the liquid-permeable surface is to be made of a ceramic material, then fine dents may have been formed by the above-mentioned mechanical means in a green sheet that is to be subjected to the firing.

Further, if the injection fitting is made of a thermoplastic material such as olefin resin like those of the embodiments of FIGS. 2 to 6 described above, there can be also employed a method of blending the plastic material with fine particles or crystalline additives for forming dents, or a method of forming fine structures by utilizing the crystallization of the resin. For example, if the powder of a metal oxide has been added in a certain amount, dents having an inner diameter corresponding to the grain size of the powder can be formed in the inner surface of the cylinder. Further, if the crystalline additives are added, the additives crystallize as the metal mold cools down and precipitate on the inner surface of the formed body enabling fine dents to be formed in the inner surface of the cylinder. According to these methods, however, the liquid-permeable surface 100 comprising fine dents is formed over the whole inner surface of the cylinder.

As the above fine oxide particles, there can be used, for example, titanium oxide, alumina, silica or the like in an amount of, usually, about 0.2 to about 5 parts by weight per 100 parts by weight of the resin (e.g., olefin resin such as polyethylene or polypropylene, or polyester resin such as PET) that forms the injection fitting.

Further, as the crystalline additive, there can be exemplified various waxes such as Candelilla wax, carnauba wax, beeswax, microcrystalline wax or paraffin wax. The crystalline additive is used about 0.2 to about 10 parts by weight per 100 parts by weight of resin forming the pouring fitting.

To form fine structures by utilizing the crystallization of the resin, further, the inner surface of the container can be formed by using various kinds of crystalline resins. For example, there can be used olefin resins such as polyethylene and polypropylene, and polyester resins such as polyethylene terephthalate and the like. The size of the fine structure formed in the inner surface can be controlled by controlling the temperature of extrusion and the temperature of the mold. The fine structure forms the dents relying on the crystallization of the resin. Upon selecting a condition in which the crystal size increases (e.g., increasing the temperature of the mold), therefore, the size of the dents can be increased. Further, the crystallization of the resin is greatly affected by also the molecular weight of the resin that is used and the branched structure thereof. To obtain desired fine dents, therefore, these parameters can be varied.

<Lubricating Liquids and Fluid Substances>

In the present invention, the lubricating liquid permeates into the liquid-permeable surface, held therein, and is put to work in this state.

The lubricating liquid is caused to permeate and is held through a simple operation; i.e., a portion of the pouring fitting where the liquid-permeating surface 100 is formed is dipped in the lubricating liquid or the lubricating liquid is sprayed thereon and, next, the lubricating liquid is drained. That is, on the liquid-permeable surface, the capillary is dominant over the gravity. Through a simple dipping operation, therefore, the lubricating liquid of a predetermined amount can be held in the liquid-permeable surface without escaping therefrom.

By using the pouring fitting of the invention, the fluid substance (i.e., fluid content) is discharged in a state where the lubricating liquid is held in the liquid-permeable surface and excellent slipping property is exhibited. Therefore, the lubricating liquid must be a liquid immiscible with the fluid content. If miscible with the content, then the lubricating liquid mixes with the content and is removed from the liquid-permeable surface.

It is, further, desired that the liquid is lowly volatile, as a matter of course; i.e., there is used a liquid having such a vapor pressure that does not volatilize even in a state where the pouring fitting is exposed to the atmosphere.

Here, the liquid immiscible with the fluid content is the one that is not miscible with the content. Roughly speaking, an oleophilic liquid is used for the aqueous contents whereas water or a hydrophilic liquid is used as a lubricating liquid for the oily contents. Usually, there is used, as the lubricating liquid, a liquid that still remains in predetermined amounts in the inner surface (liquid-permeable surface) after the fluid content is discharged in predetermined amounts through the pouring fitting and is, further, discharged selectively. Specifically, the lubricating liquid having a surface tension that is greatly different from that of the content, exhibits high lubricating effect and is suited for use in the present invention.

In the pouring fitting of the present invention as described above, the liquid-permeable surface is provided in a portion of the flow passage through which the fluid content is discharged. By utilizing the liquid-permeable surface, the layer of the lubricating liquid is formed on the surface so as to exhibit slipping property for the fluid content discharged through the flow passage. It is, therefore, necessary that the liquid-permeable surface has been covered with the lubricating liquid to not less than a certain extent.

The covering ratio F with the liquid-permeable surface can be expressed, for example, by the following formula (1), $$F=(\cos\theta-\cos\theta_B)/(\cos\theta_A-\cos\theta_B)$$

wherein $\theta$ is a water contact angle on the liquid-permeable surface holding the liquid different from the fluid substance, $\theta_A$ is a water contact angle on the liquid different from the fluid substance, and $\theta_B$ is a water contact angle on a surface of the flow passage forming no liquid-permeable surface.

That is, if the water contact angle $\theta$ on the inner surface of the container is the same as the water contact angle $\theta_A$ on the lubricating liquid, then the covering ratio F is 1.0 meaning that the inner surface of the container as a whole is covered with the lubricating liquid. In the present invention, it is desired that the covering ratio F is not less than 0.26 and, specifically, in a range of 0.30 to 1 and, more desirably, 0.35 to 0.91. Namely, the lubricating liquid is so selected, the depth d and pitch p of the dents in the liquid-permeable surface are so set, and the density of the dents (number of the dents per a unit area) is so set that the covering ratio F lies within the above-mentioned range.

If the covering ratio F is too small, it becomes difficult to gain a sufficient degree of slipping property for the fluid content. If the covering ratio F is too large, on the other hand, there is no problem in regard to the slipping property but inconvenience may occur such as defective forming.

Usually, the above-mentioned covering ratio is attained when the lubricating liquid is held in the liquid-permeable surface in an amount of about 0.5 to about 50 $g/m^2$ and, specifically, about 1 to about 50 $g/m^2$.

There is no specific limitation on the fluid substance discharged by using the pouring fitting of the present invention. Usually, however, there can be preferably used viscous paste-like or slurry fluid substance (e.g., highly viscous fluid substances having a viscosity at 25° C. of not less than 100 mPa·s, preferably, not less than 500 mPa·s and, more preferably, not less than 1000 mPa·s). Concretely, there can be used ketchup, aqueous paste, honey, various kinds of sauces, mayonnaise, mustard, jam, chocolate syrup, gelatinous foods, cosmetic liquid such as milky lotion, liquid detergent, shampoo, rinse and the like. Namely, according to the present invention, upon tilting or inverting the container, even those viscous fluid substances can be quickly discharged without adhering or staying on the surfaces of the flow passage. Besides, the fluid substance can be quickly pushed out even by pushing the container.

As described earlier, further, the lubricating liquid is immiscible with the fluid substance. Therefore, the lubricating liquid to be used is properly selected depending on the kind of the fluid content that is to be contained in the container. From the standpoint of selecting the lubricating liquid from a wide range of choice, therefore, the fluid substances are desirably those containing water (those containing lipids in amounts of not more than 75%, preferably, not more than 50% and, more preferably, not more than 10%), such as ketchup, various kinds of sauces, honey, mayonnaise, mustard, jam, chocolate syrup, milky lotion and the like. These fluid substances are hydrophilic and, therefore, an oily lubricating liquid is selected. Among the oily lubricating liquids, those having low vapor pressures are little subject to be volatilized and diffused, and are preferred since it is expected that they maintain their effects over extended periods of time.

In the present invention, examples of the lubricating liquid that can be most preferably used for the above-mentioned water-containing contents, include silicone oil, glycerin fatty acid ester, fluidized paraffin, and edible fats and oils. These substances are sparingly volatile, have been approved as food additives and, besides, are odorless providing an advantage of not spoiling the flavor of the contents.

Among the above-mentioned water-containing contents, those of the non-emulsion type are most desired. This is because the contents of the emulsion type, such as mayonnaise and milky lotion, tend to entrap and remove, though gradually, the lubricating liquid held in the liquid-permeable surface as the discharging operation is repetitively conducted. However, the contents of the non-emulsion type do not exhibit such a tendency.

In the pouring fitting of the present invention as described above, the liquid-permeable surface comprising fine dents is formed by physical means, and the lubricating liquid is held in the liquid-permeable surface so will not to be removed by the flow of the fluid substance exhibiting, therefore, greatly improved slipping property for the fluid substances and, specifically, for the viscous fluid substances. Therefore, the fluid substances can be quickly discharged without adhering or staying on the surface of the flow passage, also, featuring good liquid-dispelling property and effectively preventing the creeping of fluid from the pouring port at the end of the flow passage.

EXAMPLES

The invention will now be described by way of the following Examples in which various chemical and physical properties were measured by the methods described below.

<Measuring the Covering Ratio with the Liquid>

There was provided a hinged cap as prepared by a method that will be described later. By using a solid-liquid interface analyzing system (DropMaster 700, manufactured by Kyowa Kaimen Kagaku Co.), 3 μL of pure water was put on a test piece to measure a water contact angle θ thereof under a condition of 23° C. 50% RH. By using the obtained water contact angle, the covering ratio F with the lubricating liquid on the inner surface of the bottle was found in compliance with the following formula (1), $$F = (\cos\theta - \cos\theta_B)/(\cos\theta_A - \cos\theta_B) \quad (1)$$

wherein θ is a water contact angle on the liquid-permeable surface holding the liquid different from the fluid substance, $\theta_A$ is a water contact angle on the liquid different from the fluid substance, and $\theta_B$ is a water contact angle on a surface of the flow passage forming no liquid-permeable surface.

In finding the covering ratio F with the lubricating liquid, the following water contacting angles were used as the values $\theta_A$ and $\theta_B$.

$\theta_3$: 97.3° (value on the hinged cap alone)

$\theta_A$: 80.3° (value on the intermediate-chain fatty acid triglyceride liquid film)

θA: 102.3° (value on the silicone oil film)

<Testing the Non-Adhesion of the Fluid Substances>

A polyolefin bottle placed in the market was filled with a fluid substance described later, and a pouring member (hinged cap) provided by a method described later was fitted thereto. The fluid substance was discharged by about 10 g by pushing the container body portion. After the pushing has been ceased, the hinged cap was closed. After the above operation was repeated 10 times, adhesion of the fluid substance on the inner surface was observed with the eye through the tip of the pouring port of the cap and was evaluated on the following basis.

◯: Fluid substance did not adhere.

X: Fluid substance adhered.

<Testing the Property for Dispelling the Fluid Substances>

A polyolefin bottle placed in the market was filled with a fluid substance described later, and a pouring member (hinged cap) provided by a method described later was fitted thereto. The fluid substance was discharged by about 10 g by pushing the container body portion and, thereafter, the pushing was discontinued. After the above operation was repeated 10 times, there were evaluated, on the following basis, the time until the fluid substance separated away from the pouring port (until the liquid was dispelled) after the container has no longer been pushed and how long the fluid substance remained exposed on the end of the pouring port.

◎: The fluid substance was dispelled and did not remain just after the pushing operation was discontinued.

◯: The fluid substance was not easily dispelled but stayed exposed from the end of the pouring port despite the pushing was discontinued. The fluid substance, however, was gradually pulled back into the container or dispelled and did not remain.

X: Despite the pushing was discontinued, the fluid substance was not dispelled but remained exposed from the end of the pouring port or remained even after a while.

Here, the dispelling property represents easy fall (easy dispelling) of the fluid substance that is being discharged when the pushing operation is discontinued and unlikelihood of stay of the fluid substance in the pouring port. It is desired that the fluid substance separates away and falls down just as the pushing operation is discontinued, and almost no fluid substance remains in the pouring port.

Described below are the fluid substances that were used. Their viscosities were measured at 25° C. by using a tuning fork oscillator type viscometer SV-10 (manufactured by A and D Co.)

Fluid substances that were used:

Ketchup (tomato ketchup, viscosity=1050 mPa·s produced by Kagome Co.)

Sauce (Okonomi Sauce, viscosity=560 mPa·s produced by Otafuku Sauce Co.)

Cholate syrup (Hershey Chocolate Syrup, viscosity=1450 mPa·s produced by Hershey Japan Co.)

Lubricating liquids:

Intermediate-chain fatty acid triglyceride (surface tension $\gamma_L$=28.8 mN/m, viscosity η=33.8 mPa·s all measured at 23° C.)

Silicon oil (surface tension $\gamma_L$=19.7 mN/m, viscosity η=116.0 mPa·s all measured at 23° C.)

Example 1

5 Grams of a hydrophobic silica (R812 produced by Nihon Aerosil Co.), 95 g of ethanol (special grade, produced by Wako Jun-yaku Co.) and stirrer chips were put into a vial, hermetically sealed therein, and were stirred with a stirrer for 30 minutes to prepare a suspension of the hydrophobic silica.

There was used a polypropylene hinged cap having a pouring port with a pouring passage inner diameter φ of 6 mm and a flow passage length of 4 mm. Namely, the pouring portion only was dipped in the suspension of the hydrophobic silica and was, thereafter, dried in the atmosphere to obtain a hinged cap having a liquid-permeable surface in the pouring flow passage. The pouring portion only of the hinged cap was dipped in the lubricating liquid (intermediate-chain fatty acid triglyceride) so as to be applied with the lubricating liquid. After applied, the cap was left to stand upside down to remove excess of the lubricating liquid to a sufficient degree. The thus obtained lubricating liquid-holding hinged cap was measured for its covering ratio with liquid, and was tested for its non-adhesion of the fluid substance and property for dispelling the fluid substance. The results were as shown in Table 1.

Example 2

A lubricating liquid-holding hinged cap was prepared in the same manner as in Example 1 but using a silicone oil as the lubricating liquid. The thus prepared cap was measured for its covering ratio with the liquid, and was tested for its non-adhesion of the fluid substance and property for dispelling the fluid substance. The results were as shown in Table 1.

Comparative Example 1

An untreated hinged cap was tested for its non-adhesion of the fluid substance and property for dispelling the fluid substance. The results were as shown in Table 1.

Comparative Example 2

A hinged cap applied with the lubricating liquid was prepared in the same manner as in Example 1 but without forming the liquid-permeable surface and using the silicone oil as the lubricating liquid. The thus prepared cap was measured for its covering ratio with the liquid, and was tested for its non-adhesion of the fluid substance and property for dispelling the fluid substance. The results were as shown in Table 1.

TABLE 1

| | Liquid-permeable surface | Lubricating liquid | Covering ratio F with the liquid | Non-adhesion of fluid substance | | | Fluid substance dispelled | | |
|---|---|---|---|---|---|---|---|---|---|
| | | | | *1 | *2 | *3 | *1 | *2 | *3 |
| Ex. 1 | yes | *4 | 0.49 | ○ | ○ | ○ | ○ | ○ | ⊚ |
| Ex. 2 | yes | silicone oil | 0.57 | ○ | ○ | ○ | ○ | ○ | ⊚ |
| Comp. Ex. 1 | no | none | — | X | X | X | X | X | X |
| Comp. Ex. 2 | no | silicone oil | 1 | X | X | X | X | X | X |

*1: Ketchup,
*2: Sauce,
*3: Chocolate syrup,
*4: intermediate-chain fatty acid triglyceride From the results of testing non-adhesion of the fluid substances, it was learned that in Comparative Example 1 every fluid substance highly adhered and remained on the tip of the pouring fitting. In Examples 1 and 2, on the other hand, no fluid substance remained and highly tended to be not adhered. While in Comparative Example 2, every fluid substance highly tended to adhere and could not be effectively suppressed from adhering to or remaining on the flow passage. It was, therefore, learned that to let the fluid substances not adhere, it was necessary to form the liquid-permeable surface for holding the lubricating liquid.

From the results of testing the property for dispelling the fluid substances, further, it was learned that in Comparative Examples 1 and 2, the liquids could not be prevented from creeping whereas in Examples 1 and 2 which had been treated to be non-adherent, the liquids could be prevented from creeping.

Further, the surfaces having various covering ratios F with the liquids were prepared by the methods described below, and were measured for their covering ratios with the liquids and fluid substance slip-down rates as described below to find the covering ratios F with the liquids effective for not letting the fluid substances to adhere.

<Measuring the Fluid Substance Slip-Down Rates>

A test piece prepared by a method described below was fixed to the solid-liquid interface analyzing system (Drop-Master 700, manufactured by Kyowa Kaimen Kagaku Co.), 70 mg of a fluid substance (Kewpie Half produced by Kewpie Co.) was put on the test piece, and its slip-down behavior on an inclination of 45° was photographed by using a camera under a condition of 23° C. 50% RH. The slip-down behavior was analyzed, and a slip-down rate was calculated from the plot of moving distance vs. time. The slip-down rate was used as an index of slip-down property and non-adhesiveness; i.e., the larger the value of index, the more excellent the slip-down property and non-adhesion of the fluid substance.

Reference Example 1

A resin composition comprising a high-pressure low-density polyethylene (LDPE, MFR=0.3) and an intermediate-chain fatty acid triglyceride at a ratio of 95/5 (wt %) was prepared by using an extruder. The thus prepared test piece was measured for its covering ratio with the liquid and the fluid substance slip-down rate. The results were as shown in Table 2.

Reference Example 2

A resin composition comprising a high-pressure low-density polyethylene (MFR=0.3), a linear low-density polyethylene (LLDPE, MFR=2.2, melting point=60° C., lowly crystalline) and an intermediate-chain fatty acid triglyceride at a ratio of 82/15/3 (wt %) was prepared by using an extruder. The thus prepared test piece was measured for its covering ratio with the liquid and the fluid substance slip-down rate. The results were as shown in Table 2.

Reference Example 3

A resin composition comprising a high-pressure low-density polyethylene (MFR=0.3) and an intermediate-chain fatty acid triglyceride at a ratio of 98/2 (wt %) was prepared by using an extruder. The thus prepared test piece was measured for its covering ratio with the liquid and the fluid substance slip-down rate. The results were as shown in Table 2.

Reference Example 4

A test piece comprising a high-pressure low-density polyethylene (MFR=0.3) was measured for its covering ratio with the liquid and the fluid substance slip-down rate. The results were as shown in Table 2.

TABLE 2

| | Constitution of resin composition (wt %) | | | Fluid substance | |
|---|---|---|---|---|---|
| | LDPE | LLDPE | Intermediate-chain fatty acid triglyceride | Covering ratio F with the liquid | slip-down rate/ mm · min$^{-1}$ |
| Ref. Ex. 1 | 95 | — | 5 | 0.46 | 3.26 |
| Ref. Ex. 2 | 82 | 15 | 3 | 0.26 | 1.27 |
| Ref. Ex. 3 | 98 | — | 2 | 0.25 | 0.25 |
| Ref. Ex. 4 | 100 | — | — | 0 | 0.34 |

It was learned from Table 2 that if the covering ratio with the liquid was not more than 0.25, the fluid substance slip-down rate was small and, therefore, the slip-down property and the non-adhering property were poor. On the other hand, if the covering ratio with the liquid was not less than 0.26, the fluid substance slip-down rate was large and, therefore, the slip-down property and the non-adhering property were good.

DESCRIPTION OF REFERENCE NUMERALS

100: fluid substance
110: liquid-permeable surface
120: lubricating liquid

The invention claimed is:

1. A pouring fitting having a flow passage for flowing fluid substance,
    wherein said flow passage is forming a liquid-permeable surface in at least the tip portion thereof that serves as a pouring port,
    wherein said liquid-permeable surface is holding a liquid different from said fluid substance,
    wherein a covering ratio F with the liquid is within a range of 0.35 to 0.91, said covering ratio F being represented by the following formula (1), $$F = (\cos\theta - \cos\theta_B)/(\cos\theta_A - \cos\theta_B) \quad (1)$$

wherein θ is a water contact angle on the liquid-permeable surface holding the liquid different from the fluid substance,
    $\theta_A$ is a water contact angle on the liquid different from the fluid substance, and
    $\theta_B$ is a water contact angle on a surface of the flow passage forming no liquid-permeable surface, and
    wherein said pouring fitting is fitted onto a mouth portion of a container.

2. The pouring fitting according to claim 1, wherein said liquid is immiscible with said fluid substance.

3. The pouring fitting according to claim 1, wherein said pouring fitting is formed of a plastic material.

4. The pouring fitting according to claim 1, wherein said pouring fitting is a cap fitted onto a mouth portion of a container, said cap having a pouring cylinder that serves as the flow passage when the fluid substance contained in the container is poured out.

5. The pouring fitting according to claim 4, wherein said pouring fitting is a hinged cap fitted onto the mouth portion of a container.

6. The pouring fitting according to claim 1, wherein said pouring fitting is a spout fitted onto a bag-like container or a container made from a paper.

7. A packing container fitted with the pouring fitting of claim 1, and contains a viscous paste-like or slurry fluid substance having a viscosity at 25° C. of not less than 100 mPa·s.

* * * * *